(12) United States Patent
Schwenter et al.

(10) Patent No.: US 12,716,759 B2
(45) **Date of Patent: *Aug. 25, 2026**

(54) MEASURING TRANSDUCER OF A MEASURING DEVICE, AND MEASURING DEVICE

(71) Applicant: Endress+Hauser Flowtec AG, Reinach (CH)

(72) Inventors: Benjamin Schwenter, Ettingen (CH); Marc Werner, Grenzach-Wyhlen (DE); Markus Schütz, Lampenberg (CH)

(73) Assignee: Endress+Hauser Flowtec AG, Reinach (CH)

( * ) Notice: Subject to any disclaimer, the term of this patent is extended or adjusted under 35 U.S.C. 154(b) by 188 days.

This patent is subject to a terminal disclaimer.

(21) Appl. No.: 18/254,799

(22) PCT Filed: Nov. 26, 2021

(86) PCT No.: PCT/EP2021/083119
§ 371 (c)(1),
(2) Date: May 26, 2023

(87) PCT Pub. No.: WO2022/112482
PCT Pub. Date: Jun. 2, 2022

(65) Prior Publication Data
US 2024/0003726 A1 Jan. 4, 2024

(30) Foreign Application Priority Data
Nov. 27, 2020 (DE) ..................... 10 2020 131 563.5

(51) Int. Cl.
*G01F 1/84* (2006.01)

(52) U.S. Cl.
CPC .......... *G01F 1/8413* (2013.01); *G01F 1/8422* (2013.01); *G01F 1/8427* (2013.01); *G01F 1/8486* (2013.01)

(58) Field of Classification Search
CPC ......... G01F 1/3409–3427; G01F 1/8468–8486
See application file for complete search history.

(56) References Cited

U.S. PATENT DOCUMENTS

| | | | | |
|---|---|---|---|---|
| 5,157,975 A | | 10/1992 | Tanaka et al. | |
| 5,445,436 A | * | 8/1995 | Kemnitz | A47C 5/06 297/452.64 |

(Continued)

FOREIGN PATENT DOCUMENTS

| | | |
|---|---|---|
| CN | 102756067 A1 | 10/2012 |
| CN | 107430020 A1 | 12/2017 |

(Continued)

*Primary Examiner* — Justin N Olamit
(74) *Attorney, Agent, or Firm* — Christopher R. Powers; Endress+Hauser (USA) Holding, Inc.

(57) ABSTRACT

A measuring transducer includes: a measuring tube arrangement having at least one measuring tube for conveying a flowable medium; at least a first exciter component of an oscillation exciter for exciting the at least one measuring tube to execute oscillations; at least a first sensor component of an oscillation sensor for registering oscillations of the at least one measuring tube; a fixing body arrangement, which is connected with the at least one measuring tube and via which a releasable connection with a support apparatus can be made; a connecting apparatus for releasable connecting of the measuring tube arrangement with a process line; and a fastener apparatus for forming a shape-interlocking and/or force-interlocking connection between the connecting apparatus and the fixing body arrangement.

26 Claims, 6 Drawing Sheets

(56) References Cited

U.S. PATENT DOCUMENTS

| | | | | |
|---|---|---|---|---|
| 6,158,290 | A * | 12/2000 | Hussain | G01F 1/8413 73/861.357 |
| 7,004,037 | B2 * | 2/2006 | Andresen | G01F 1/8477 73/861.355 |
| 8,365,614 | B2 * | 2/2013 | Shimizu | G01F 1/8413 73/861.355 |
| 9,951,934 | B2 * | 4/2018 | Buck | H02G 3/088 |
| 10,209,113 | B2 | 2/2019 | Young et al. | |
| 11,391,612 | B2 * | 7/2022 | Chatzikonstantinou | G01F 1/8422 |
| 12,228,438 | B2 * | 2/2025 | Schwenter | G01F 1/8477 |
| 2003/0097881 | A1 | 5/2003 | Schlosser et al. | |
| 2007/0121031 | A1 | 5/2007 | Kitamura et al. | |
| 2014/0202097 | A1 * | 7/2014 | Rodgers | E04C 2/388 52/309.4 |
| 2017/0146380 | A1 | 5/2017 | Young et al. | |
| 2017/0215564 | A1 * | 8/2017 | Sande | A46B 7/042 |
| 2018/0045546 | A1 | 2/2018 | Nielson et al. | |
| 2019/0277681 | A1 | 9/2019 | Nielson et al. | |
| 2020/0319006 | A1 | 10/2020 | Malani et al. | |

FOREIGN PATENT DOCUMENTS

| | | | |
|---|---|---|---|
| CN | 115667857 | A1 | 1/2023 |
| DE | 4026724 | A1 | 3/1992 |
| DE | 102006013601 | A1 | 9/2007 |
| DE | 102010030341 | A1 | 1/2011 |
| EP | 1807681 | A2 | 7/2007 |
| JP | 2002318386 | A | 10/2002 |
| WO | 2011099989 | A1 | 8/2011 |
| WO | 2019017891 | A1 | 1/2019 |

* cited by examiner 63
81.1
81.2
81.4
71
81.3

63
71
87
5
74

MEASURING TRANSDUCER OF A MEASURING DEVICE, AND MEASURING DEVICE

CROSS-REFERENCE TO RELATED APPLICATIONS

The present application is related to and claims the priority benefit of German Patent Application No. 10 2020 131 563.5, filed on Nov. 27, 2020, and International Patent Application No. PCT/EP2021/083119, filed Nov. 26, 2021, the entire contents of which are incorporated herein by reference.

TECHNICAL FIELD

The invention relates to a measuring transducer of a measuring device for registering, for a flowable medium, mass flow, viscosity, density and/or a variable derived therefrom and to a measuring device for registering, for a flowable medium, mass flow, viscosity, density and/or a variable derived therefrom, especially a measuring device in the form of a Coriolis flow measuring device, preferably for biopharmaceutical applications.

BACKGROUND

Field devices of process measurements technology with measuring transducers of vibration-type and, especially, Coriolis flow measuring devices, have been known for many years. The basic construction of such a measuring device is described, for example, in EP 1 807 681 A1, wherein, for construction of a field device of the field of the invention in the context of the present invention, comprehensive reference is taken to this publication.

Typically, Coriolis flow measuring devices have one or more oscillatable measuring tubes, which can be made to execute oscillations by means of an oscillation exciter. These oscillations involve the tube length and are influenced by the type of flowable medium located in the measuring tube and its flow velocity. An oscillation sensor, or especially two, mutually spaced oscillation sensors, at another position of the measuring tube can register the varied oscillations in the form of a measurement signal or a plurality of measurement signals. From the one or more measurement signals an evaluation unit can then ascertain, for the flowable medium, the mass flow, viscosity, density and/or a variable derived therefrom.

Coriolis flow measuring devices with replaceable, single use, measuring tube arrangements are known. Thus, for example, taught in WO 2011/099989 A1 is a method for producing a monolithically formed measuring tube arrangement of a Coriolis flow measuring device with bent measuring tubes, wherein the measuring tube bodies of the measuring tubes are first solidly formed of a polymer and the channel for conveying the flowable medium is then machined in with a cutting tool. WO 2011/099989 A1 teaches—identically to U.S. Pat. No. 10,209,113 B2—a connecting body, which is adapted to receive and to support the replaceable measuring tube arrangement. The two documents do not disclose, however, how the single use measuring tube arrangement is connectable to a hose and/or plastic tube system.

SUMMARY

Starting from the above-described state of the art, an object of the invention is to provide a solution for connecting the measuring transducer to a hose and/or plastic tube system.

Furthermore, an object of the invention is to provide a measuring device having a corresponding measuring transducer.

The object is achieved by the measuring transducer and the measuring device according to the present disclosure.

The measuring transducer of the invention for a measuring device for registering, for a flowable medium, mass flow, viscosity, density and/or a variable derived therefrom, comprises:

- a measuring tube arrangement for conveying the flowable medium,
  - wherein the measuring tube arrangement includes at least one measuring tube,
  - wherein the at least one measuring tube has an inlet section and an outlet section;
- at least a first exciter component of an oscillation exciter for exciting the at least one measuring tube to execute oscillations,
  - wherein the at least one exciter component is arranged on the at least one measuring tube;
- at least a first sensor component of an oscillation sensor for registering oscillations of the at least one measuring tube
  - wherein the at least a first sensor component is arranged on the at least one measuring tube;
- a fixing body arrangement
  - wherein the fixing body arrangement is connected with the at least one measuring tube in the inlet section and in the outlet section; and
- a connecting apparatus for releasable connecting of the measuring tube arrangement with a process line,
  - wherein the connecting apparatus includes measuring tube connection openings, to which the measuring tube arrangement is connected,
  - wherein the connecting apparatus is connected with the at least one measuring tube in the inlet section and in the outlet section,
- a fastener apparatus
  - wherein via the fastener apparatus a shape-interlocking and/or force-interlocking connection is formed between the connecting apparatus and the fixing body arrangement.

The measuring device of the invention, especially a Coriolis flow measuring device of the invention, for registering, for a flowable medium, mass flow, viscosity, density and/or a variable derived therefrom, comprises:

- a support apparatus;
- the measuring transducer of the invention;
- at least a second exciter component of the oscillation exciter; and
- at least a second sensor component of the oscillation sensor.
  - wherein the support apparatus 16 has a support apparatus body 18 with a seat 29,
  - wherein the measuring transducer is arranged in the seat 29 and connectable mechanically releasably with the support apparatus body 18;
  - wherein the second exciter component is arranged on the support apparatus body,
  - wherein the second sensor component is arranged on the support apparatus body,
  - wherein the oscillation exciter includes an operating circuit, which is connected with at least one exciter component, especially the second exciter component, of the oscillation exciter,
  - wherein the oscillation sensor includes a measuring circuit, which is electrically connected with at least one sensor component, especially the second sensor component, of the oscillation sensor.

According to the invention, the connecting apparatus serves as an adapter for connecting the measuring tube arrangement to hose and/or plastic tube systems of variable nominal diameter. Thus, the measuring tube arrangement can be produced independently of the hose and/or plastic tube system and, when required, be connected to the hose and/or plastic tube system via corresponding process connections via a connecting apparatus provided for the hose and/or plastic tube system.

The connecting apparatus can be formed of a material comprising steel, plastic, ceramic and/or glass.

The measuring tubes comprise measuring tube bodies of a material comprising metal, especially steel, plastic, glass and/or ceramic. The measuring tubes each have at least one bend. Preferably, a basic form of the measuring tube body is U-shaped. There are, however, also other known forms having at least one bend, which also fall within the scope of protection of the invention.

The at least one oscillation exciter includes usually at least one exciter magnet and at least one exciter coil for producing a time variable magnetic field. The exciter magnet is arranged on the measuring tube to be excited for executing oscillations. The exciter coil can be arranged on an additional measuring tube or on a support apparatus, on which the measuring tube, or measuring transducer, is mounted and which serves to shield the measuring transducer from disturbing influences and/or to accommodate the electronic components of the measuring device, such as measuring, operating and/or evaluation circuitry. The measuring tube arrangement can, additionally, have a unique identifier, for example, in the form of a QR code and/or an RFID tag. The identifier can contain information concerning the zero point and/or the calibration factor, with whose help the evaluation circuit ascertains a corrected measured variable.

The at least one oscillation sensor includes, as a rule, at least one sensor magnet and a sensor coil for registering a time variable magnetic field. The sensor magnet is arranged on a measuring tube to be caused to execute oscillations. The sensor coil can be arranged on an additional measuring tube to be caused to execute oscillations or on the support apparatus of the measuring device.

By shape interlocking between connecting apparatus and fixing body arrangement, a connecting of the two components is possible without a supplemental tool. The connection between the fixing body arrangement and the connecting apparatus can be so embodied that a releasing of the connection is only possible by breaking, or separating, the fastener apparatus from the connecting apparatus. Additionally, the opening and the fastener apparatus can be embodied in such a manner that a defective associating of fastener apparatus and measuring tube arrangement is prevented.

In the embodiment, the connecting apparatus performs the function of a manifold, i.e., it divides a flow into two separate flows. Because connecting apparatus and measuring tube arrangement are two separate components, the geometry and shape of the measuring tubes can be embodied, or optimized, independently of the form and geometry of the connecting apparatus.

Advantageous embodiments of the invention are set forth in the dependent claims.

An embodiment provides that the fixing body arrangement has a first fixing body arrangement side and a second fixing body arrangement side, wherein the first fixing body arrangement side and the second fixing body arrangement side face away from one another, wherein a fixing body arrangement opening extends from the first fixing body arrangement side to the second fixing body arrangement side, wherein the fastener apparatus extends through the fixing body arrangement opening, wherein the connecting apparatus has a contact area, wherein the fixing body arrangement has a contact area on the first fixing body arrangement side, wherein the two contact areas contact one another, wherein the connecting apparatus exerts a force on the fixing body arrangement via the fastener apparatus with a force component in the direction of the second fixing body arrangement side wherein the fastener apparatus is connected with the connecting apparatus by material bonding or is monolithically connected with the connecting apparatus.

A force component acting supplementally to the shape-interlocking connection in the direction of the second fixing body arrangement side impedes the releasing of the connection.

The fastener apparatus is embodied in such a manner that it elastically deforms to a certain extent when passing through the opening and then snaps into engagement, in order, thus, to form the shape-interlocking connection.

An embodiment provides that the connecting apparatus has a first connecting apparatus side and a second connecting apparatus side, wherein the first connecting apparatus side and the second connecting apparatus side face away from one another, wherein a connecting apparatus opening extends from the first connecting apparatus side to the second connecting apparatus side, wherein the fastener apparatus extends through the connecting apparatus opening, wherein the fastener apparatus has a contact area, wherein the connecting apparatus has a contact area on the first connecting apparatus side, wherein the two contact areas contact one another, wherein the measuring tube arrangement exerts via the fastener apparatus a force on the connecting apparatus with a force component in the direction of the second connecting apparatus side, wherein the fastener apparatus is connected with the fixing body arrangement especially by material bonding or is connected monolithically with the fixing body arrangement.

It is additionally advantageous that at least the fixing body arrangement is made of steel and the connecting apparatus is made of a plastic. In this way, an effective securement in a seating apparatus is enabled and a shifting of the zero point in the installation is reduced. This has, additionally, the advantage that the connection between fixing body arrangement and connecting apparatus is more difficult to release.

An embodiment provides that the fastener apparatus comprises at least one catch.

An embodiment provides that the fastener apparatus comprises at least four catches, which are arranged rotationally symmetrically about a rotational axis, wherein the rotational axis extends in parallel with a longitudinal axis of the measuring tube arrangement.

An embodiment provides that the connecting apparatus has a connecting apparatus opening, wherein the fixing body arrangement has a fixing body arrangement opening, wherein the fastener apparatus includes at least one clamping leg, wherein the at least one clamping leg extends through the fixing body arrangement opening and, at least partially, through the connecting apparatus opening, wherein the fastener apparatus includes a pin, wherein the pin extends through the fixing body arrangement opening and, at least partially, though the connecting apparatus opening and is adapted to exert a force on the at least one clamping leg radially to the longitudinal axis of the connecting apparatus opening.

This leads to an improving of the securement and an implementing of a non-releasable connection, which is especially suitable for biotech applications.

An embodiment provides that the fastener apparatus comprises an, especially non-releasable, rivet, preferably an expanding rivet.

An embodiment provides that the fastener apparatus has at least one spreadable leg, especially a spreadable leg monolithically connected with the connecting apparatus, wherein the fastener apparatus has a fastener apparatus opening, wherein the fixing body arrangement has a fixing body arrangement opening, wherein the at least one spreadable leg extends through the fixing body arrangement opening, wherein the fastener apparatus includes a pin, wherein the pin is arranged in the fastener apparatus opening and is adapted to exert a radial force on the at least one spreadable leg.

An advantage of the embodiment lies in the simplification of assembling the two components, connecting apparatus and measuring tube arrangement. Alternatively, the fastener apparatus, especially the pin, can be integrated in the connecting apparatus. Such can be implemented via support structures, which hold the pin in the connecting apparatus opening. When the pin is pressed in, the connections of the pin to the support structure are released. Such an embodiment of the connecting apparatus can be manufactured, for example, by means of an injection molding method.

An embodiment provides that the fastener apparatus comprises at least one Christmas tree clip.

An embodiment provides that the connecting apparatus has a connecting apparatus body, wherein the connecting apparatus body comprises a plastic, preferably a polyether ether ketone, polyaryletherketone, polyphenyl sulfone, polyether sulfone, polysulfone, polyacrylamide, polypropylene, polycarbonate, polyethylene, fluoropolymer and/or HIGH-DENSITY polyethylene, wherein the measuring tube arrangement has a measuring tube arrangement body, wherein the measuring tube arrangement body comprises steel.

There is demand for measuring devices with single use measuring tubes and single use measuring tube arrangements for biopharmaceutical applications. For such purpose, the materials, which contact the medium, must be biocompatible and gamma sterilizable. It is, consequently, especially advantageous that the measuring tube be made of one of the above-mentioned materials because these fulfill the biopharmaceutical requirements. The mentioned plastics are suitable, additionally, as feed for an injection molding method for producing the connecting apparatus.

Advantageously, the material of the measuring tube arrangement body differs from the material of the connecting apparatus body. This can reduce the total weight of the measuring transducer. The measuring tubes can preferably be formed of steel and the connecting apparatus of plastic. The hybrid system formed therefrom fulfills the requirements for measuring performance and is at the same time light in weight, this, in turn, being especially advantageous in the gamma sterilization method.

An embodiment provides that the fastener apparatus is deformed especially by means of ultrasonic riveting in such a manner that an end section of the fastener apparatus has a greater cross-sectional area than a cross sectional area of the fixing body arrangement opening or the connecting apparatus opening.

In ultrasonic riveting, a part of the plastic fastener apparatus—here the end section—is deformed in such a manner that a rivet forms for producing a rivet connection between the connecting apparatus and the fixing body arrangement.

An embodiment provides that the fastener apparatus forms a material-bonded connection with the first fixing body arrangement side.

It has been found to be advantageous so to choose the material of the fastener apparatus that the fastener apparatus in the case of ultrasonic riveting becomes, at least sectionally, especially in contact with the first fixing body arrangement side, liquid and, thus, a material-bonded, adhesive connection is obtained between fastener apparatus and fixing body arrangement.

An embodiment provides that the fastener apparatus has a grooved surface in an end region.

Advantageously in this embodiment, a weld puddle can be advanced in defined manner.

An embodiment provides that the fastener apparatus has a fastener apparatus thickness, wherein the connecting apparatus is embodied as a hollow body and has a connecting apparatus thickness, wherein the fastener apparatus thickness is always less than or equal to a maximum connecting apparatus thickness.

An embodiment provides that the fastener apparatus has a fastener apparatus diameter, wherein the fastener apparatus diameter is greater than or equal to twice the maximum connecting apparatus thickness, wherein the fastener apparatus has a blind hole or a traversing passageway, which extends through the fixing body arrangement opening and limits the fastener apparatus thickness.

An embodiment provides that the connecting apparatus has at least one opening, wherein the fastener apparatus extends through the at least one opening.

An embodiment provides that the connecting apparatus has at least two openings, wherein the fastener apparatus includes at least two plugs, wherein the at least two plugs extend through the at least two openings, wherein the fastener apparatus includes a connecting element, especially a bracket element, which connects the at least two plugs with one another.

Advantageous in this embodiment is that it reduces the number of assembly steps and at the same time the manufacturing steps for the plugs.

An embodiment provides that the connecting apparatus has at least four openings, wherein the fastener apparatus includes at least four plugs, which are connected together via at least four brackets.

An alternative embodiment provides that the connecting apparatus has at least four openings, wherein the fastener apparatus includes at least four plugs, which are connected via an especially plate-shaped connecting body.

An embodiment provides that the at least one plug has a plug opening, which is embodied in such a manner that a plug wall thickness in an end region of the plug is always less than or equal to a maximum plug wall thickness.

This provides that pockmarks are effectively prevented in the plug.

An embodiment provides that the openings and plugs are arranged symmetrically to a mirror plane of the measuring tube arrangement.

It has been surprisingly found to be advantageous to arrange the plugs symmetrically to a mirror plane of the measuring tube arrangement, especially the measuring tubes, since this leads to a reduction of the zero-point error.

An embodiment provides that the at least one plug includes a head, which has on a plug side facing the first fixing body arrangement side an undercut, which is not in contact with the fixing body arrangement.

The head has a greater cross-sectional area than the part of the at least one plug extending through the fixing body arrangement opening. The providing of an undercut has the advantage of fewer defects from sharp edged locations at the contact region between fixing body arrangement and fastener apparatus.

An alternative embodiment provides that the at least one plug is connected with the connecting apparatus by means of ultrasonic welding in such a manner that a material-bonded connection is formed.

An alternative for connecting the fixing body arrangement with the connecting apparatus by means of ultrasonic riveting is ultrasonic welding. In contrast with ultrasonic riveting, no rivet is formed by sectional forming of the connecting apparatus, but, instead, a plug or rivet of plastic is ultrasonically welded with the connecting apparatus, which is likewise made of plastic. The plug, or the rivet, can be monolithically connected with the connecting apparatus or embodied as a separate component, which is arranged in an opening of the connecting apparatus.

An embodiment provides that the measuring tube arrangement comprises two bent measuring tubes,

- wherein a measuring tube mirror plane extends, in each case, through the two measuring tubes,
- wherein the at least one plug is arranged within a section bounded by the two measuring tube mirror planes or at least intersects one of the measuring tube mirror planes,
- wherein two measuring tube planes extending perpendicularly to the measuring tube mirror planes bound a region, in which the at least one plug is arranged,
- wherein one of the measuring tube planes intersects the inlets of the measuring tubes and one of the measuring tube planes intersects the outlets of the measuring tubes.

BRIEF DESCRIPTION OF THE DRAWINGS

The invention will now be explained in greater detail based on the appended drawing, the figures of which show as follows.

DETAILED DESCRIPTION

Figure 1:
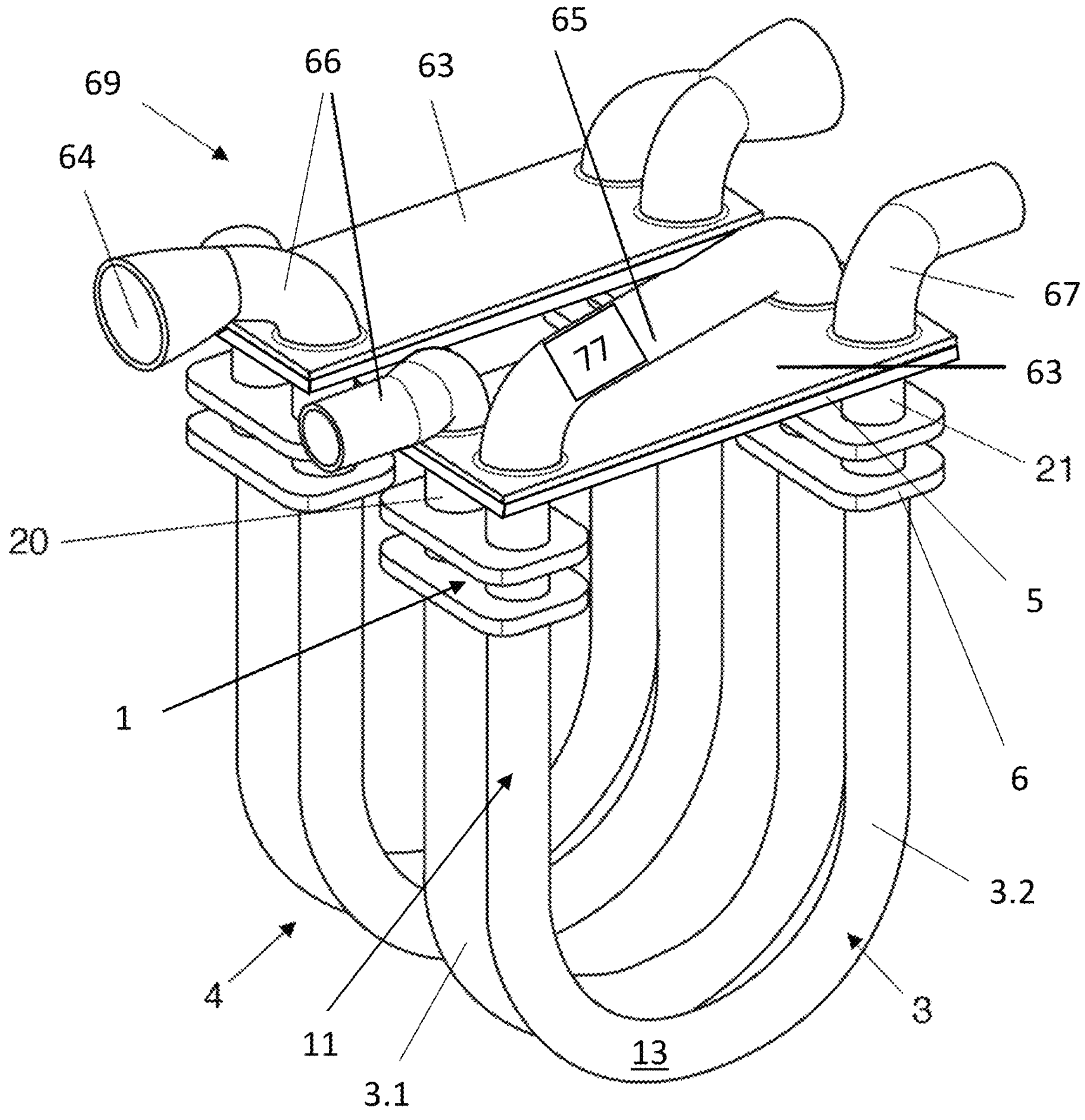
FIG. 1 hows a perspective view of two embodiments of the measuring transducer according to the present disclosure.

FIG. 1 shows a perspective view of two embodiments of the measuring transducer 69. The first embodiment includes a measuring tube arrangement 4 with an associated fixing body arrangement 5. The measuring tube arrangement 4 has exactly two measuring tubes 3.1, 3.2, which are coupled mechanically together via a coupler arrangement 1 comprising two coupling elements 6 in the inlet section 20 and two coupling elements 6 in the outlet section 21. Coupling elements 6 serve to form an oscillator from the two measuring tubes 3 excited individually to execute oscillations. In the illustrated embodiment, the coupling elements 6 are plate-shaped with rounded edges. However, also other forms are known. The invention is not limited as regards shape and number of coupling elements 6. For reasons of perspicuity, the oscillation exciter and the oscillation sensors, especially their individual components, are not shown. Between inlet section 20 and outlet section 21, the two measuring tubes 3.1, 3.2 have, in each case, two legs 11 and a bend connecting the two legs 11, such that the measuring tube bodies 13 are U-shaped. A fixing body arrangement 5 is arranged on the ends of the measuring tubes 3.1, 3.2 and connects the two measuring tubes 3.1, 3.2 of the measuring tube arrangement 4 together. Mechanically connected with the fixing body arrangement 5 is a connecting apparatus 63, which has connection openings 64, to which in a connected state a hose and/or plastic tube system is connected and which can act as process connection. A large number of process connections are known, such as flanges, cutting ring fittings, screw-type hose couplings, connection ports, etc. The connection openings 64 serve as manifolds and have, in each case, a channel 66, 67. In the first embodiment, the inlet channel 66 formed by one of the connection openings 64 splits into two separate channels, which are connected one with each inlet section 20 of the two measuring tubes 3. Similar considerations hold also for the outlet channel 67. The outlet channel 67 has two channels, one for each of the outlet sections 21 of the two measuring tubes 3. The two channels of the outlet channel 67 merge and form the other of the connection openings 64. The nominal diameter of the connection openings 64 and the nominal diameter of the measuring tubes 3 can differ. The flow direction of the medium conveyed through the connection openings 64 differs from the flow direction of the medium in the inlet- and/or outlet section 20, 21.

The second embodiment has a measuring tube arrangement 4 identical to that of the first embodiment and differs exclusively in the embodiment of the connecting apparatus 63. The inlet channel 66 is connected with the inlet section 20 of the first measurement tube 3.1. The outlet channel 67 of the connecting apparatus 63 is connected with the outlet section 21 of the second measuring tube 3.2. A connecting channel 65 connects the outlet section 21 of the first measurement tube 3.1 with the inlet section of the second measuring tube 3.2. The measuring tube arrangement 4 has a mirror plane, which extends between the two measuring tubes 3.1, 3.2, in parallel with the longitudinal axes of the legs 11. The connecting channel 65 has a longitudinal axis, which is inclined relative to the mirror plane of the measuring tube arrangement 4. Arranged on the exterior of the connection channel 65, as near as possible to the conveyed medium, is a temperature sensor 77. The temperature sensor 77 can be, for example, a Pt100 or PT1000 element.

Connecting apparatus 63 includes a connecting apparatus body, which comprises a plastic and preferably a polyether ether ketone (PEEK), polyaryletherketone (PAEK), polyphenyl sulfone (PPSU), polyether sulfone (PESU), polysulfone (PSU), polyarylamide (PARA), polypropylene (PP), polycarbonate (PC), polyethylene (PE), fluoropolymer and/or HIGH-DENSITY polyethylene (HDPE). Additionally, the measuring tube arrangement 4 has a measuring tube arrangement body comprised of steel and formed, especially, of steel.

Figure 4:
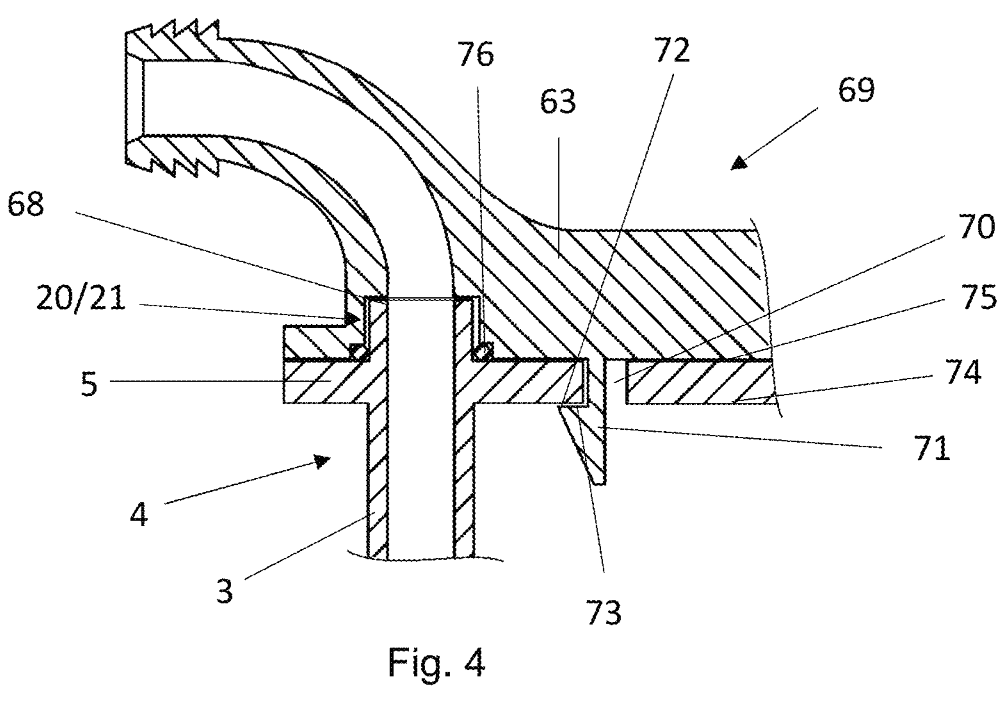
FIG. 4 shows a subsection of a longitudinal section of an embodiment of the measuring transducer according to the present disclosure.
Figure 5:
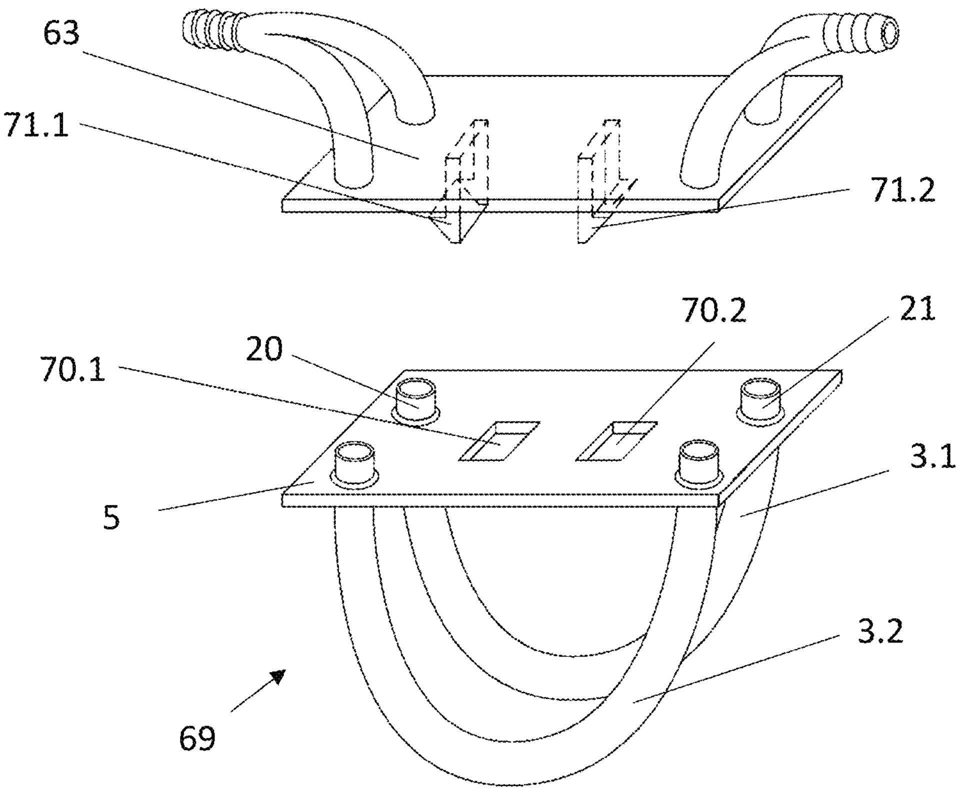
FIG. 5 shows an exploded view of an embodiment of the measuring transducer according to the present disclosure.

Connecting apparatus 63 is connected with the fixing body arrangement 5 via a fastener apparatus at least by shape interlocking. The fastener apparatus is not shown in FIGS. 1 to 3. Details of an embodiment are shown in FIGS. 4 and 5.

Figure 2:
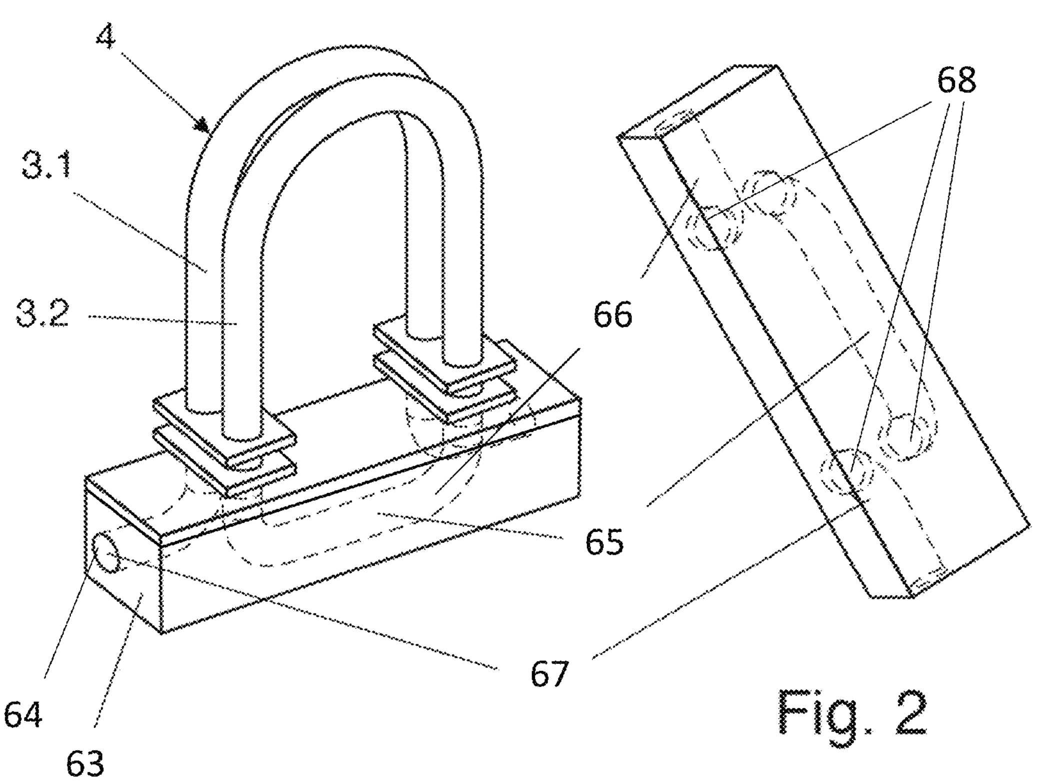
FIG. 2 shows two perspective views of another embodiment of the measuring transducer and the connecting apparatus according to the present disclosure.

FIG. 2 shows two perspective views of another embodiment of the measuring transducer 69 of the invention, especially the connecting apparatus 63. The measuring tube arrangement 4 is essentially identical with the measuring tube arrangement 4 shown in the embodiments of FIG. 1. Connecting apparatus 63 is solidly and prismatically embodied. The inlet channel 66 and the outlet channel 67 are machined into the connecting apparatus 63 and have, in each case, a bend, or are embodied L-shaped. Inlet channel 66 connects a measuring tube connection opening 68 with a tube connection opening 64. Likewise, the outlet channel 67 connects a measuring tube connection opening 68 with a tube connection opening 64. Inlet channel 66 is connected to the inlet section 20 of the first measurement tube 3.1. The outlet channel 67 is connected to the outlet section 21 of the first measurement tube 3.1. Connecting apparatus 63 includes, additionally, a connecting channel 65, which has a longitudinal axis, which lies in a plane shared with the longitudinal axes of the legs of the second measuring tube 3.2. The inlet section 20 of the second measuring tube 3.2 is connected via the connecting channel 65 with the outlet section 21 of the second measuring tube 3.2. Thus, the medium is conveyed exclusively through the first measurement tube 3.1.

Figure 3:
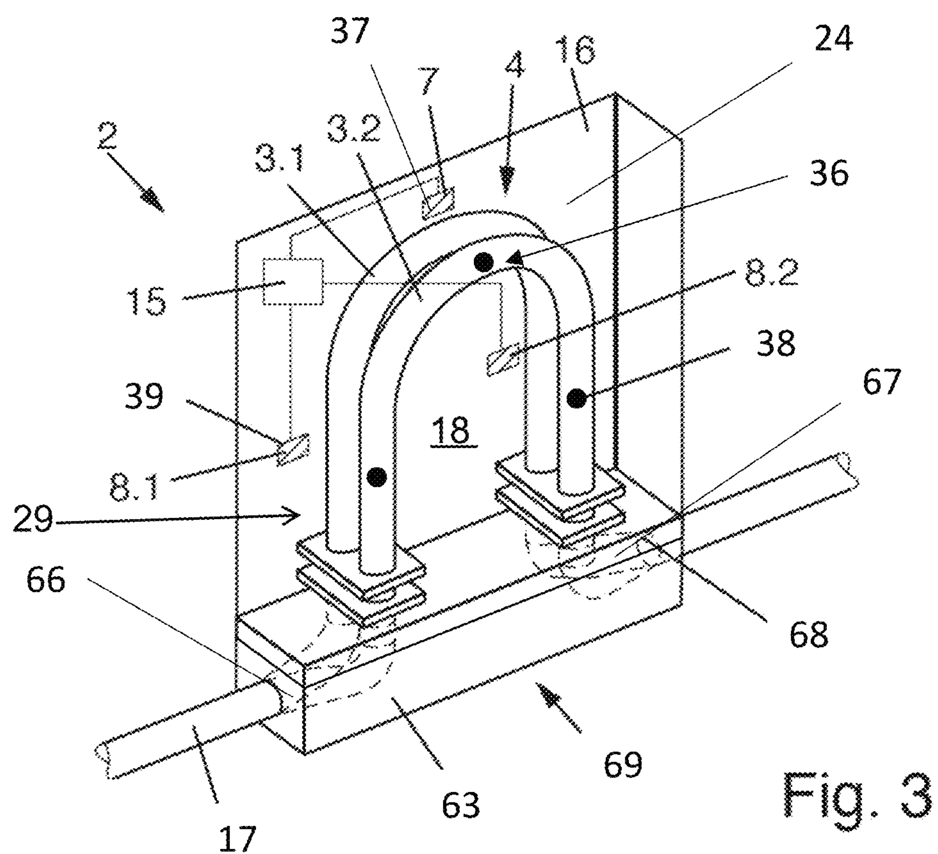
FIG. 3 shows a partially sectioned, perspective view of an embodiment of the measuring device according to the present disclosure.

FIG. 3 shows a partially sectioned, perspective view of an embodiment of the measuring device 2, comprising a measuring transducer 69 connected to a hose and/or plastic tube system 17. As before, the measuring tube arrangement 4 of the measuring transducer 69 is identical with that of the embodiments shown in FIG. 1 and FIG. 2. The measuring transducer 69 is held in a support apparatus 16, in which the measuring- and/or operating circuit 15 is also arranged, which with the oscillation exciter 7 and the two oscillation sensors 8.1, 8.2 are connected. Connecting apparatus 63 is prismatically embodied and includes an inlet channel 66, which splits as a manifold to feed the inlet sections of the two measuring tubes 3.1, 3.2. The outlet channel 67 extends as a manifold from the outlet sections 21 of the measuring tubes 3.1, 3.2 to the tube connection opening 68.

Arranged on the measuring tubes 3.1, 3.2 are, in each case, an exciter magnet 36 and two sensor magnets 38, which are components of the oscillation exciter 7 and the two oscillation sensors 8.1, 8.2. The oscillation exciter 7 includes an exciter coil 37. The two oscillation sensors 8.1, 8.2 also each have a sensor coil 39. The coils 37, 39 are all arranged in the support apparatus 16, or sunk into a wall of the support apparatus 16. Arranged on the measuring tubes 3.1, 3.2 are the exciter magnet 36 and sensor magnets 38. The two measuring tubes 3.1, 3.2 have, in each case, a longitudinal plane, which is at the same time also a mirror plane. These mirror planes divide the measuring tubes 3.1, 3.2, in each case, into two sides. In each case, three magnets are arranged on the far sides of the two measuring tubes 3.1, 3.2. One of the three magnets is an oscillation exciter component, and two of the three magnets are oscillation sensor components.

The electronic measuring- and/or operating circuit 15 is adapted to ascertain and to provide, for a flowable medium, the mass flow, viscosity and/or density and/or variables derived therefrom. Additionally, the measuring- and/or operating circuit 15 is embodied to send an operating signal to the oscillation exciter 7.

FIG. 4 shows a subsection of a longitudinal section of the measuring transducer 69 of the invention. Measuring transducer 69 includes a measuring tube arrangement 4 for conveying the flowable medium, a fixing body arrangement 5 and a connecting apparatus 63 for releasable connecting of the measuring tube arrangement 4 with a process line. Fixing body arrangement 5 is connected with at least one measuring tube 3 in the inlet section 20 and/or in the outlet section 21 and includes at least one opening 70. Connecting apparatus 63 includes measuring tube connection openings 68, to which the measuring tube arrangement 4 is connected. Additionally, the connecting apparatus 63 is connected with the at least one measuring tube 3 in the inlet section 20 and/or in the outlet section 21. Connecting apparatus 63 includes at least one fastener apparatus 71, which extends through the opening 70 of the fixing body arrangement 5 and via which the connecting apparatus 63 is connected at least by shape interlocking with the fixing body arrangement 5. Fixing body arrangement 5 includes a first fixing body arrangement side 74 and a second fixing body arrangement side 75, wherein the first fixing body arrangement side 74 and the second fixing body arrangement side 75 face away from one another. Opening 70 extends from the first fixing body arrangement side 74 to the second fixing body arrangement side 75. Connecting apparatus 63 has a contact area 72 and the fixing body arrangement 5 has a contact area 73 on the first fixing body arrangement side 74, wherein the contact area 72 and the contact area 73 contact one another. Fastener apparatus 71 is embodied in such a manner that after the engaging of the fastener apparatus 71 the connecting apparatus 63 exerts via the fastener apparatus 71 a force on the fixing body arrangement 5 with a force component in the direction of the second fixing body arrangement side 75.

Fastener apparatus 71 includes a catch, which extends through the opening 70 and engages with the second fixing body arrangement side of the fixing body arrangement 5. Fastener apparatus 71 is embodied in such a manner that it elastically deforms to a point when moving through the opening 70 and then snaps into an engagement position, in order, thus, to form the shape-interlocking connection.

Arranged between connecting apparatus 63 and the second fixing body arrangement side 75 of the fixing body arrangement 5 is an elastic seal 76—in the form of a sealing ring. Seal 76 is clamped between connecting apparatus 63 and fixing body arrangement 5 and the clamping is maintained via the shape interlocking.

Connecting apparatus 63 includes a measuring tube connection opening 68, which is embodied complementary to the inlet section 20 of a measuring tube. Furthermore, the connecting apparatus 63 includes a measuring tube connection opening 68, which is embodied complementary to the outlet section 21 of a measuring tube. In the assembled state, the inlet section 20 and the outlet section 21 of the measuring tube 3 are arranged in their openings.

FIG. 5 shows an exploded view of an embodiment of the measuring transducer 69 of the invention. The measuring tube arrangement 4 includes two, mutually parallel measuring tubes 3.1, 3.2, which have, in each case, in the inlet section 20 an inlet with an inlet direction and in the outlet section 21 an outlet with an outlet direction. Additionally, the two measuring tubes 3.1, 3.2 each have exactly one bend between inlet section 20 and outlet section 21. In this way, the inlet direction and the outlet direction are oppositely directed. Fixing body arrangement 5 is connected with the inlet section 20 and the outlet section 21 of each of the measuring tubes 3.1, 3.2. Connecting apparatus 63 includes exactly two fastener apparatuses 71.1, 71.2 and the fixing body arrangement 5 includes correspondingly exactly two openings 70.1, 70.2. The fastener apparatuses are embodied as catches. In an assembled state, the two fastener apparatuses 71.1, 71.2 extend through the two openings 70.1, 70.2. In such case, the connecting apparatus 63 effects via the two fastener apparatus 71.1, 71.2, in each case, a force on the fixing body arrangement 5 with a force component in the direction of the second fixing body arrangement side 75.

Figure 6:
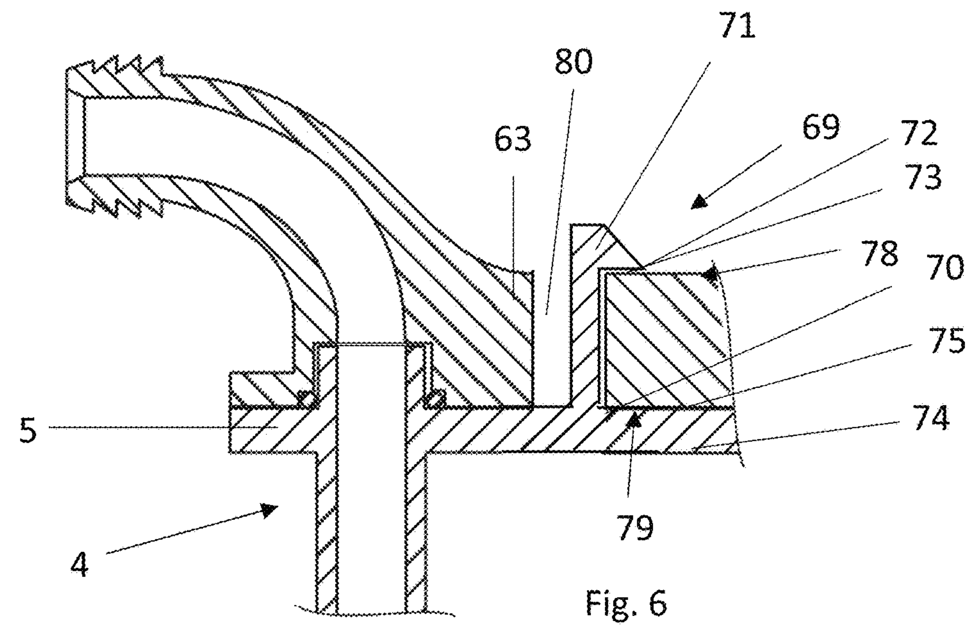
FIG. 6 shows a subsection of a longitudinal section through another embodiment of the measuring transducer according to the present disclosure.

FIG. 6 shows a subsection of a longitudinal section through another embodiment of the measuring transducer of the invention. This differs from the embodiment of FIG. 4 in that there is provided instead of a fixing body arrangement opening a connecting apparatus opening 82, which extends from a first connecting apparatus side 78 of the connecting apparatus 63 to a second connecting apparatus side 79 of the connecting apparatus 63, wherein the first connecting apparatus side 78 and the second connecting apparatus side 79 face away from one another. The fastener apparatus 71 extends in the assembled state through the connecting apparatus opening 82 and is resiliently embodied, so that it can deflect upon introduction into the connecting apparatus opening 82. The connecting apparatus opening 82 can be conically formed. A contact area 72 of the fastener apparatus 71 and a contact area 73 of the connecting apparatus 63 located on the first connecting apparatus side 78 contact one another. In order to implement an effective securement, the fastener concept is fashioned in such a manner that the measuring tube arrangement 4 exerts via the apparatus 71 a force on the connecting apparatus 63 with a force component in the direction of the second connecting apparatus side 79. The fastener apparatus 71 is connected monolithically with the fixing body arrangement 5 as one piece. Alternatively, the fastener apparatus 71 can be connected with the fixing body arrangement 5 by material bonding.

FIGS. 7 A to D show schematic, longitudinal section views of other embodiments of the connecting apparatus.

Figure 7A:
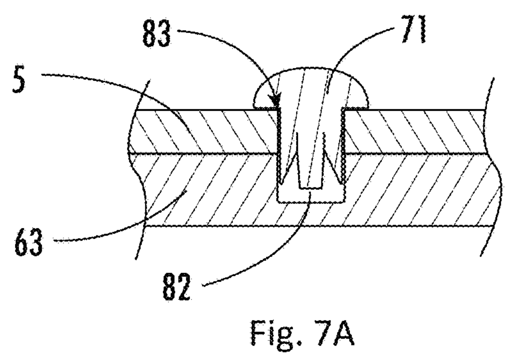
Figs. 7A-7D show other embodiments of the connecting apparatus in cross- sectional views according to the present disclosure.

FIG. 7A shows a connecting apparatus 63, which has a connecting apparatus opening 82 embodied as a blind hole, and a fixing body arrangement 5, which has a fixing body arrangement opening 83 embodied as a traversing passageway. The fastener apparatus 71 is an expanding, non-releasable rivet and embodied in such a manner that the leg in the installed state presses against the wall of the blind bore and, thus, provides a force-interlocking connection.

Figure 7B:
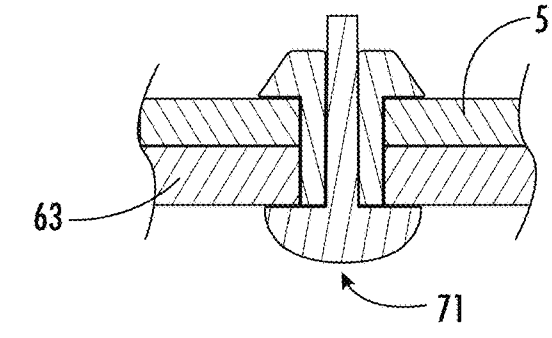

The embodiment of FIG. 7B differs from the embodiment of FIG. 7A essentially in that the connecting apparatus 63 has a connecting apparatus opening 82 embodied as a traversing passageway and the fastener apparatus 71 has two or more clamping legs 84, which extend through the fixing body arrangement opening 83 and through the connecting apparatus opening 82. Alternatively, the clamping legs 84 can be connected monolithically with the connecting apparatus 63 (see FIG. 7D). The fastener apparatus 71 is composed of at least two parts and includes supplementally a pin 85, which extends through the fixing body arrangement opening 83 and through the connecting apparatus opening 82. The pin 85 is adapted to exert a force on the two clamping legs 84 radially to the longitudinal axis of the connecting apparatus opening 82 The pin 85 is a separate component and is introduced through the corresponding opening, or openings after the at least two clamping legs have been inserted. Pin 85 can be terminally widened, such that the pin 85 pushes against the clamping leg 84 and so provides a non-releasable connection.

Figure 7C:
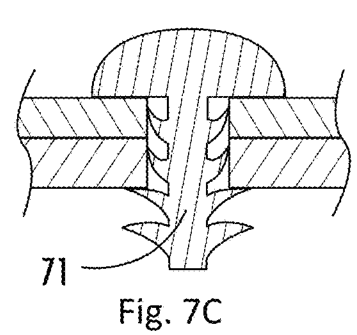

FIG. 7C shows a fastener apparatus 71 embodied as a Christmas tree clip with barbs, which, on the one hand, via friction and shape interlocking impede a releasing of the connection. In such case, it does not matter from which fixing body arrangement side the fastener apparatus 71 is led through the connecting apparatus opening 82 and fixing body arrangement opening 83. The interaction between the barbs and the wall of the opening provides a shape-interlocking connection while the barbs in the end region of the Christmas tree clip also provide a shape-interlocking connection.

Figure 7D:
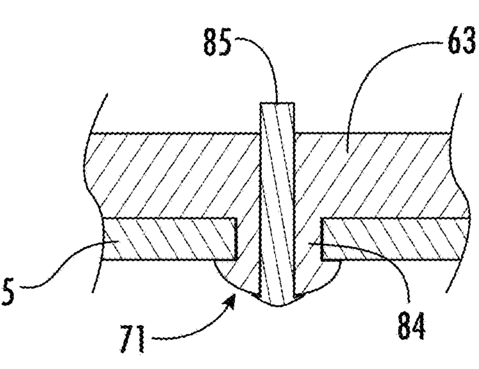

FIG. 7D shows an embodiment, which differs from that in FIG. 7B essentially in that the clamping legs 84 and the connecting apparatus 63 are embodied as one piece. The clamping legs 84 are resiliently embodied, such that in the case of introduction of the pin 85 into the provided opening they spread apart and form a shape-interlocking connection between the fixing body arrangement 5 and the connecting apparatus 63. The fastener apparatus 71 can be made in such a manner that the pin 85 before the securement with the connecting apparatus 63 likewise is connected monolithically via e.g., support structures. Upon securement, the connection with the support structure is, at least partially, released.

Figures 8, 9:
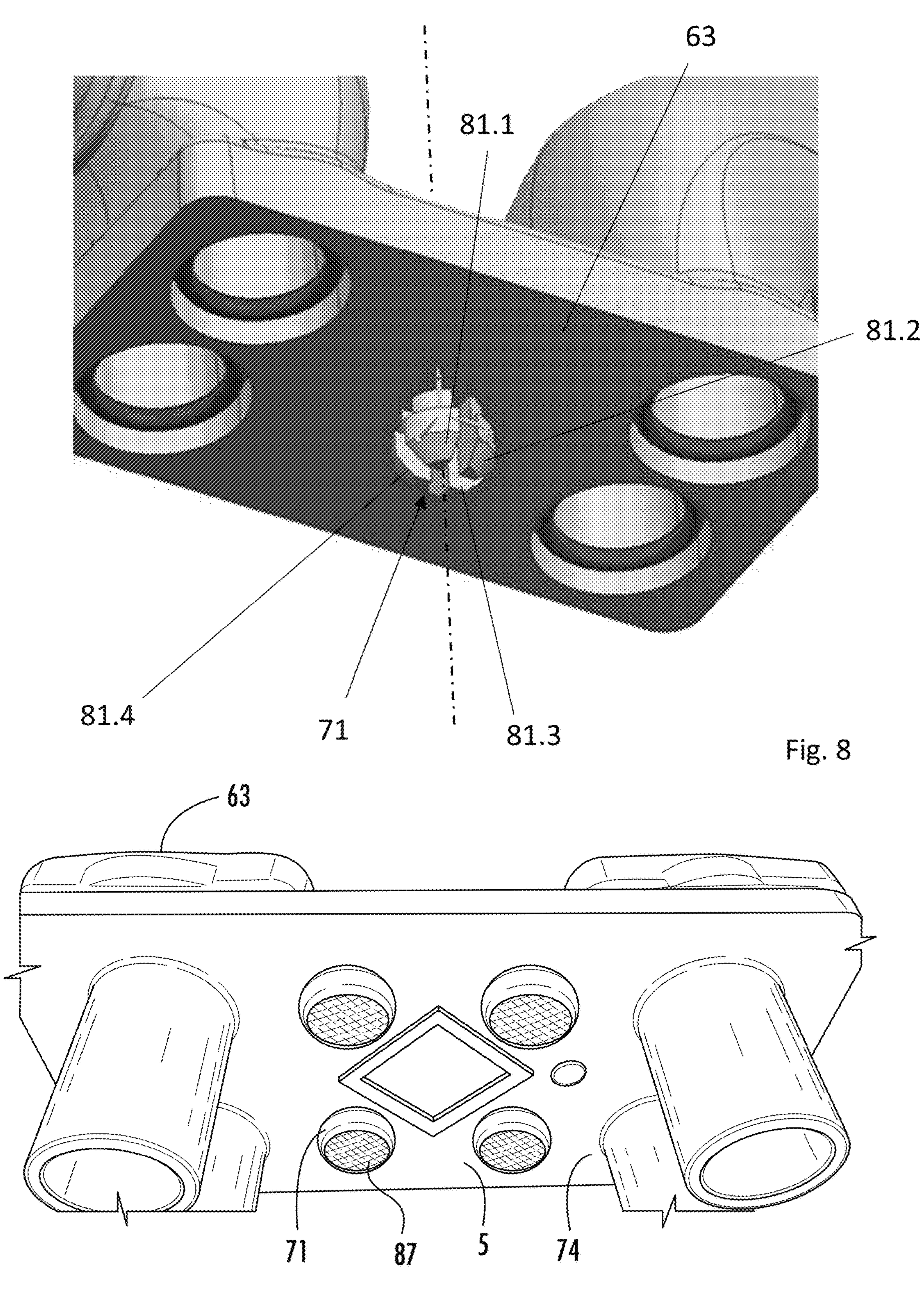
FIG. 8 shows a perspective view of another embodiment of the connecting apparatus according to the present disclosure.
FIG. 9 shows a perspective view of another embodiment of the connecting apparatus according to the present disclosure.

FIG. 8 is a perspective view of another embodiment of the fastener apparatus 71, which is adapted to be introduced into a fixing body arrangement opening of the fixing body arrangement and to exert a force on the fixing body arrangement with a force component in the direction of the second fixing body arrangement side of the fixing body arrangement. The fastener apparatus 71 is connected monolithically with the connecting apparatus 63 and formed by at least one catch 81, or four catches 81.1, 81.2, 81.3, 81.4. The four catches 81.1, 81.2, 81.3, 81.4 have equal lengths and are rotationally symmetrically arranged about a rotational axis extending in parallel with a longitudinal axis of the measuring tube arrangement (not shown). Additionally, the four catches 81.1, 81.2, 81.3, 81.4 have contact areas, which have the form of a circular ring segment or a cutout of a peeled off lateral surface of a frustum. The fastener apparatus 71 is centrally arranged and can have an opening for a pin, which is adapted to spread the four catches 81.1, 81.2, 81.3, 81.4.

FIG. 9 shows a perspective view of another embodiment of the connecting apparatus of the invention, which is deformed by means of ultrasonic riveting in such a manner that an end section of the fastener apparatus 71 has a greater cross-sectional area than a cross sectional area of the fixing body arrangement opening or the connecting apparatus opening. In the case of deformation of a section of the fastener apparatus by means of a sonotrode, it is possible by suitable selection of the material of the fastener apparatus 71 to provide a sectional melting of the fastener apparatus 71. This occurs especially in the contact region between fastener apparatus 71 and fixing body arrangement 5. The fastener apparatus 71 forms, thus, a material-bonded connection with the first fixing body arrangement side 74. Furthermore, the fastener apparatus 71 has a grooved surface 87 in an end region. The shown fastener apparatus 71 is rivet shaped, especially embodied as a flat round head rivet according to DIN 674. Furthermore, four fastener apparatuses are used for connection of the fixing body arrangement 5 with the connecting apparatus 63. The four fastener apparatuses form the four corners of a rectangle and are arranged symmetrically to a mirror plane of the measuring tube arrangement.

Figure 10:
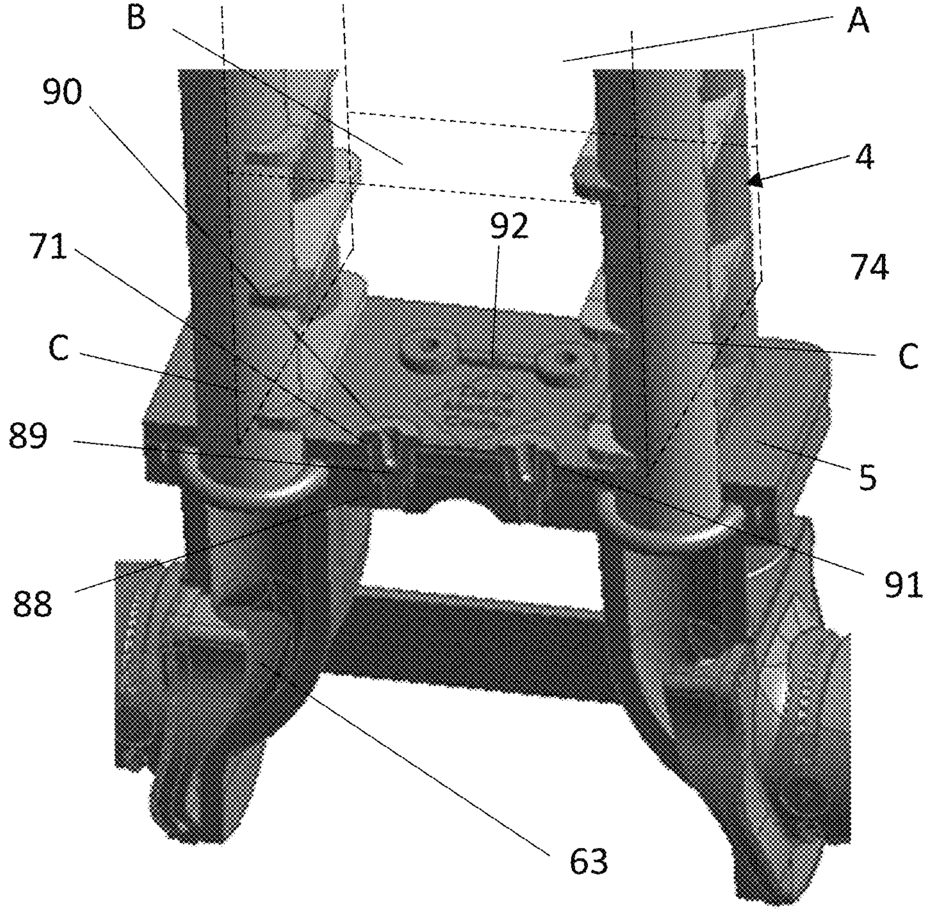
FIG. 10 shows an at least partially sectioned view of another embodiment of the connecting apparatus according to the present disclosure.

FIG. 10 shows an at least partially sectioned view of another embodiment of the connecting apparatus 63 of the invention, which is embodied as a hollow body and has a connecting apparatus thickness. The shown fastener apparatus 71 has a fastener apparatus thickness, which is always less than or equal to a maximum connecting apparatus thickness of the connecting apparatus 63. Furthermore, the fastener apparatus 71 has at least sectionally a fastener apparatus diameter, which is greater than or equal to twice the maximum connecting apparatus thickness. In this section, the fastener apparatus 71 has a blind hole (alternatively also a traversing passageway could be provided), which extends through the fixing body arrangement opening 70 and which bounds the fastener apparatus thickness. The shown connecting apparatus 63 includes, additionally, at least one opening 88—in the illustrated case there are exactly four openings. The two shown fastener apparatuses 71 comprise, in each case, two plugs, which extend through the four openings. The two plugs 89, in each case, together forming a fastener apparatus 71, are connected via a connecting element. In such case, the connecting element is embodied as a bracket element, which connects the at least two plugs with one another. Alternatively, the fastener apparatus 71 has at least four plugs, which are connected together via an especially plate-shaped connecting element. Shown are two fastener apparatuses; alternatively, also only one fastener apparatus can be provided comprising exactly one or exactly two plugs. In an embodiment with four plugs, these can be connected via four bracket elements, wherein the four bracket elements form a quadrilateral, especially a rectangle. In the illustration, the plugs have, in each case, a plug opening 90, which is embodied in such a manner that a plug wall thickness in an end region of the plug 89 is always less than or equal to a maximum plug wall thickness. Furthermore, the openings 88 and plug 89 are arranged symmetrically to a mirror plane of the measuring tube arrangement 4. This assures that the zero-point error of the flow measurement signal is reduced. The plugs have, in each case, a head, which has on a plug side facing the first fixing body arrangement side 74 an undercut 91, such that the plug in this subsection is not in contact with the metal fixing body arrangement 5. The fastener apparatus 71, especially the plugs, are connected with the connecting apparatus 63 by means of ultrasonic welding in such a manner that a material-bonded connection is formed.

The invention claimed is:

1. A measuring transducer of a measuring device for registering mass flow, viscosity, density and/or a variable derived therefrom for a flowable medium, the measuring transducer comprising:

- a measuring tube arrangement configured to convey the medium, the measuring tube arrangement including at least one measuring tube, wherein the at least one measuring tube includes an inlet section and an outlet section;
- at least a first exciter component of an oscillation exciter adapted to excite the at least one measuring tube to execute oscillations, wherein the at least one exciter component is arranged on the at least one measuring tube;
- at least a first sensor component of an oscillation sensor for registering oscillations of the at least one measuring tube, wherein the at least first sensor component is arranged on the at least one measuring tube;
- a fixing body arrangement connected to the at least one measuring tube in the inlet section and in the outlet section;
- a connecting apparatus configured to enable a releasable connecting of the measuring tube arrangement with a process line, wherein the connecting apparatus includes measuring tube connection openings, to which the measuring tube arrangement is connected, and wherein the connecting apparatus is connected to the at least one measuring tube in the inlet section and in the outlet section; and
- a fastener apparatus, wherein via the fastener apparatus a shape-interlocking and/or force- interlocking connection is formed between the connecting apparatus and the fixing body arrangement, wherein:

- the fixing body arrangement includes a first fixing body arrangement side and a second fixing body arrangement side;
- the first fixing body arrangement side and the second fixing body arrangement side face away from each other;
- a fixing body arrangement opening extends from the first fixing body arrangement side to the second fixing body arrangement side;
- the fastener apparatus extends through the fixing body arrangement opening;
- the connecting apparatus includes a connecting contact area;
- the fixing body arrangement includes a fixing body contact area on the first fixing body arrangement side; and
- the connecting contact area and the fixing body contact area contact one another, wherein the connecting apparatus exerts a force on the fixing body arrangement via the fastener apparatus with a force component in a direction of the second fixing body arrangement side, and wherein the fastener apparatus is connected to the connecting apparatus by material bonding or is monolithically connected with the connecting apparatus.

2. The measuring transducer of claim 1, wherein:

the connecting apparatus includes a first connecting apparatus side and a second connecting apparatus side;

the first connecting apparatus side and the second connecting apparatus side face away from one another;
a connecting apparatus opening extends from the first connecting apparatus side to the second connecting apparatus side;
the fastener apparatus extends through the connecting apparatus opening;
the fastener apparatus includes a fastener contact area;
the connecting apparatus includes a connecting contact area on the first connecting apparatus side; and
the fastener contact area and the connecting contact area contact one another.

3. The measuring transducer of claim 2, wherein the measuring tube arrangement exerts via the fastener apparatus a force on the connecting apparatus with a force component in a direction of the second connecting apparatus side, and
wherein the fastener apparatus is connected to the fixing body arrangement by material bonding or is connected monolithically with the fixing body arrangement.

4. The measuring transducer of claim 1, wherein the fastener apparatus comprises at least one catch.

5. The measuring transducer of claim 4, wherein the at least one catch of the fastener apparatus comprises at least four catches, which are arranged rotationally symmetrically about a rotational axis, wherein the rotational axis extends in parallel with a longitudinal axis of the measuring tube arrangement.

6. The measuring transducer of claim 1, wherein:
the connecting apparatus includes a connecting apparatus opening embodied as a first traversing passageway;
the fixing body arrangement includes a fixing body arrangement opening embodied as a second traversing passageway;
the fastener apparatus includes at least one clamping leg, wherein the at least one clamping leg extends through the fixing body arrangement opening and, at least partially, through the connecting apparatus opening; and
the fastener apparatus includes a pin, wherein the pin extends through the fixing body arrangement opening and, at least partially, through the connecting apparatus opening and is adapted to exert a force on the at least one clamping leg radially to a longitudinal axis of the connecting apparatus opening.

7. The measuring transducer of claim 1, wherein the fastener apparatus comprises a non-releasable rivet.

8. The measuring transducer of claim 1, wherein:
the fastener apparatus includes at least one spreadable leg monolithically connected to the connecting apparatus;
the fastener apparatus includes a connecting apparatus opening;
the fixing body arrangement includes a fixing body arrangement opening;
the at least one spreadable leg extends through the fixing body arrangement opening; and
the fastener apparatus includes a pin, wherein the pin is arranged in the connecting apparatus opening and is adapted to exert a radial force on the at least one spreadable leg.

9. The measuring transducer of claim 1, wherein the fastener apparatus comprises at least one Christmas tree clip.

10. The measuring transducer of claim 1, wherein:
an elastic seal is disposed between the connecting apparatus and the second fixing body arrangement side; and
the seal is clamped between connecting apparatus and fixing body arrangement in a clamped state, wherein the clamped state is maintained via shape interlocking.

11. The measuring transducer of claim 1, wherein the fastener apparatus is deformed by ultrasonic riveting such that an end section of the fastener apparatus has a greater cross-sectional area than a cross-sectional area of either the fixing body arrangement opening or a connecting apparatus opening of the connecting apparatus.

12. The measuring transducer of claim 11, wherein the fastener apparatus has a grooved surface in an end region.

13. The measuring transducer of claim 1, wherein the fastener apparatus forms a material-bonded connection with the first fixing body arrangement side.

14. The measuring transducer of claim 1, wherein:
the fastener apparatus includes a fastener apparatus thickness;
the connecting apparatus is embodied, at least partially, as a hollow body having a connecting apparatus thickness; and
the fastener apparatus thickness is always less than or equal to a maximum of the connecting apparatus thickness.

15. The measuring transducer of claim 14, wherein the fastener apparatus has a fastener apparatus diameter, which is greater than or equal to twice the maximum connecting apparatus thickness, and
wherein the fastener apparatus includes a blind hole or a traversing passageway, which extends through the fixing body arrangement opening and which limits the fastener apparatus thickness.

16. The measuring transducer of claim 1, wherein the connecting apparatus includes at least one fastener opening, and wherein the fastener apparatus extends through the at least one fastener opening.

17. The measuring transducer of claim 16, wherein the fastener apparatus includes at least one plug, wherein the at least one plug includes a plug opening, which is embodied such that a plug wall thickness in an end region of the at least one plug is always less than or equal to a maximum plug wall thickness.

18. The measuring transducer of claim 16, wherein the fastener apparatus includes at least one plug, wherein each of the at least one plugs includes a head, which includes an undercut on a plug side facing a first fixing body arrangement side of the fixing body arrangement, which undercut is not in contact with the fixing body arrangement.

19. The measuring transducer of claim 1, wherein:
the connecting apparatus includes at least two fastener openings;
the fastener apparatus includes at least two plugs, wherein the at least two plugs extend through the at least two fastener openings, respectively; and
the fastener apparatus includes a connecting bracket element, which connects the at least two plugs relative to each other.

20. The measuring transducer of claim 19, wherein the at least two fastener openings and the at least two plugs are arranged symmetrically to a mirror plane of the measuring tube arrangement.

21. The measuring transducer of claim 1, wherein the connecting apparatus includes at least four fastener openings, wherein the fastener apparatus includes at least four plugs, which are connected via at least four bracket elements.

22. The measuring transducer of claim 1, wherein the connecting apparatus has at least four fastener openings, wherein the fastener apparatus includes at least four plugs, which are connected via a plate-shaped connecting element.

23. The measuring transducer of claim 1, wherein the fastener apparatus includes at least one plug, wherein the at least one plug is connected with the connecting apparatus by ultrasonic welding such that a material-bonded connection is formed.

24. The measuring transducer of claim 1, wherein:

the fastener apparatus includes at least one plug;

the at least one measuring tube of the measuring tube arrangement comprises two bent measuring tubes;

a separate measuring tube mirror plane extends through each of the two measuring tubes;

the at least one plug is disposed within a section bounded by the two measuring tube mirror planes or at least intersects one of the measuring tube mirror planes;

two measuring tube planes extending perpendicularly to the two measuring tube mirror planes bound a region in which the at least one plug is disposed; and one of the measuring tube planes intersects the inlet sections of the two measuring tubes, and one of the measuring tube planes intersects the outlet sections of the two measuring tubes.

25. The measuring transducer of claim 1, wherein:

the connecting apparatus includes a connecting apparatus body;

the connecting apparatus body comprises a plastic, including at least one of: polyether ether ketone (PEEK), polyaryletherketones (PAEK), polyphenyl sulfone (PPSU), polyether sulfone (PESU), polysulfone (PSU), polyarylamide (PARA), polypropylene (PP), polycarbonate (PC), polyethylene (PE), fluoropolymer and high-density polyethylene (HDPE);

the measuring tube arrangement includes a measuring tube arrangement body; and the measuring tube arrangement body comprises a metal.

26. A Coriolis flow measuring device, for registering mass flow, viscosity, density and/or a variable derived therefrom for a flowable medium, the measuring device comprising:

a support apparatus;

a measuring transducer according to claim 1;

at least a second exciter component of the oscillation exciter; and at least a second sensor component of the oscillation sensor, wherein:

the support apparatus includes a support apparatus body with a seat;

the measuring transducer is disposed in the seat and is connectable mechanically releasably with the support apparatus body;

the second exciter component is arranged on the support apparatus body;

the second sensor component is arranged on the support apparatus body;

the oscillation exciter includes an operating circuit in communication with at least one of the first and second exciter components of the oscillation exciter; and the oscillation sensor includes a measuring circuit electrically connected to at least one of the first and second sensor components of the oscillation sensor.

* * * * *